(No Model.)
F. FRAZER.
HAME CLIP.
No. 254,299. Patented Feb. 28, 1882.
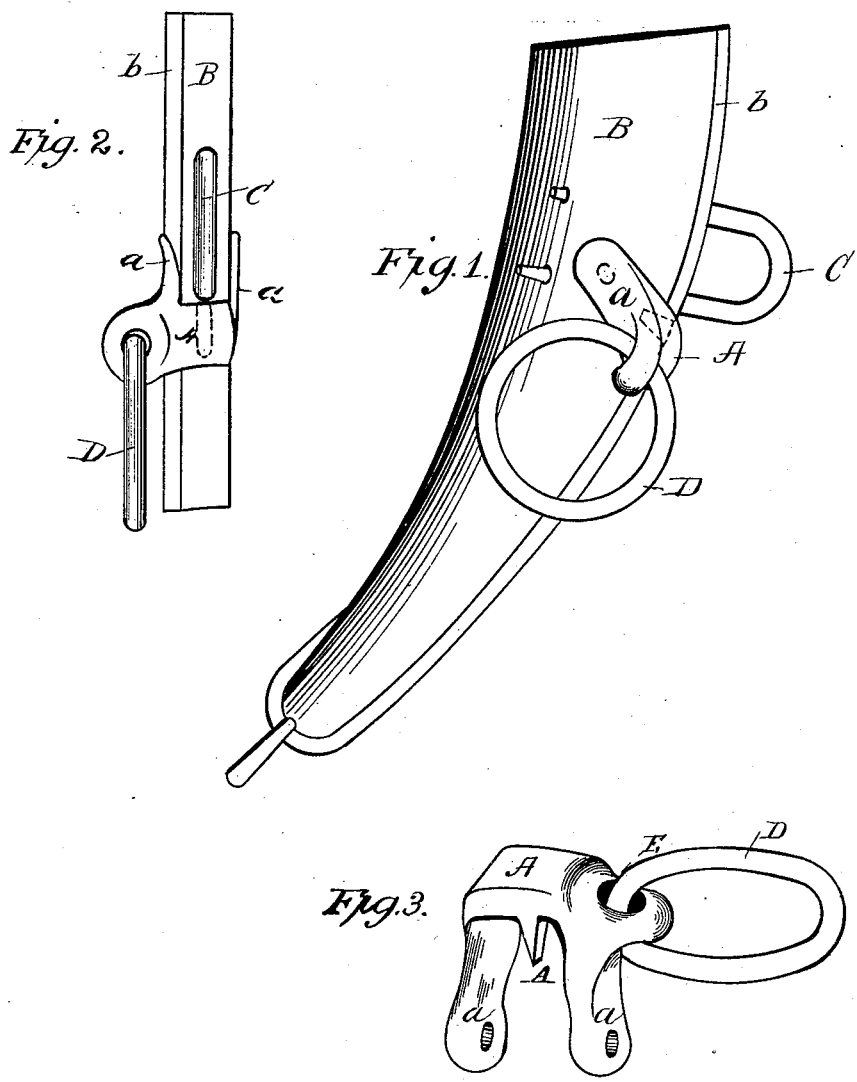
Witnesses:
Inventor:

United States Patent Office.

FRED FRAZER, OF SYRACUSE, NEW YORK.

HAME-CLIP.

SPECIFICATION forming part of Letters Patent No. 254,299, dated February 28, 1882.

Application filed January 24, 1882. (No model.)

*To all whom it may concern:*

Be it known that I, FRED FRAZER, a citizen of the United States, residing at Syracuse, in the county of Onondaga and State of New York, have invented certain new and useful Improvements in Hame-Clips; and I do hereby declare that the following is a full, clear, and exact description of the invention, which will enable others skilled in the art to which it appertains to make and use the same.

My improvement consists in forming the clip with two members or legs connected by a cross-bar, said bar being extended and formed into an eye for the breast-ring, and provided with or without a lug on the under side of the bar, which engages, when used, with a perforation in the metal back or iron-bound portion of the hame, as will now be fully described.

Referring to the drawings, forming a part of this specification, Figure 1 is a plan view of a section of the hame with the clip applied. Fig. 2 is an edge view. Fig. 3 is a perspective view of the clip and breast-ring separate from the hame.

Like letters of reference indicate the same parts in the different views.

A is the clip, which is provided with two angular members or legs, $a\,a$, the inner ends of which are perforated to receive a rivet passed transversely through the hame. The outer ends of the legs $a\,a$ are united by a bar, which is extended and formed with an eye, E, through which is passed the breast-ring D.

On the under side of the bar which unites the two legs of the clip is a lug, A′, the purpose of which will be explained hereinafter. B in the drawings represents an ordinary wooden hame with a metal back or lining, $b$. The tug-staple C is inserted through holes in the metal lining $b$ and passed transversely through the wooden portion of the hame, and the ends of the staple are upset or secured in any other suitable manner.

A short distance below the staple the metal binding or lining $b$ is slotted to receive the lug A′, which is preferably wedge-shaped, although I do not limit myself to this form.

The clip is applied to the back of the hame, one leg projecting on each side thereof, and in an upward or diagonal direction, and with the lug A′ inserted in the slot or aperture B′ in the back of the hame-iron. A bolt or rivet is then passed through the holes in the ends of the legs $a\,a$ and the wooden portion of the hame and properly secured.

By my improvement the clip is held from displacement both by the bolt or rivet passed through the legs of the clip and the body of the hame and by the lug engaging with the slot in the metal back or lining.

Having thus fully described my invention, what I claim as new, and desire to secure by Letters Patent, is—

1. A hame-clip provided with two legs or members perforated at their inner ends to receive the bolt or rivet which fastens the clip to the hame, and connected at their outer ends by a bar which is extended and formed with an eye for the breast-strap ring, the said bar carrying a lug on its under side, which is adapted to engage with a slot or aperture in the metallic binding of the hame, substantially as and for the purpose set forth.

2. The combination of a wooden hame having a metal binding, slotted, as described, with a clip having two legs which straddle the hame, and secured thereto by a bolt or rivet, said clip having a bar, A, which is extended and formed into an eye for the breast-strap ring, and provided on its under side with a lug to engage with the slot in the metal binding, and a suitable tug-staple, all substantially as and for the purpose set forth.

FRED FRAZER.

Witnesses:
JNO. J. LYNCH,
W. F. PARDEE.